May 13, 1969    H. E. FINCH    3,444,077
LIQUID CLARIFYING METHOD
Filed Jan. 21, 1965
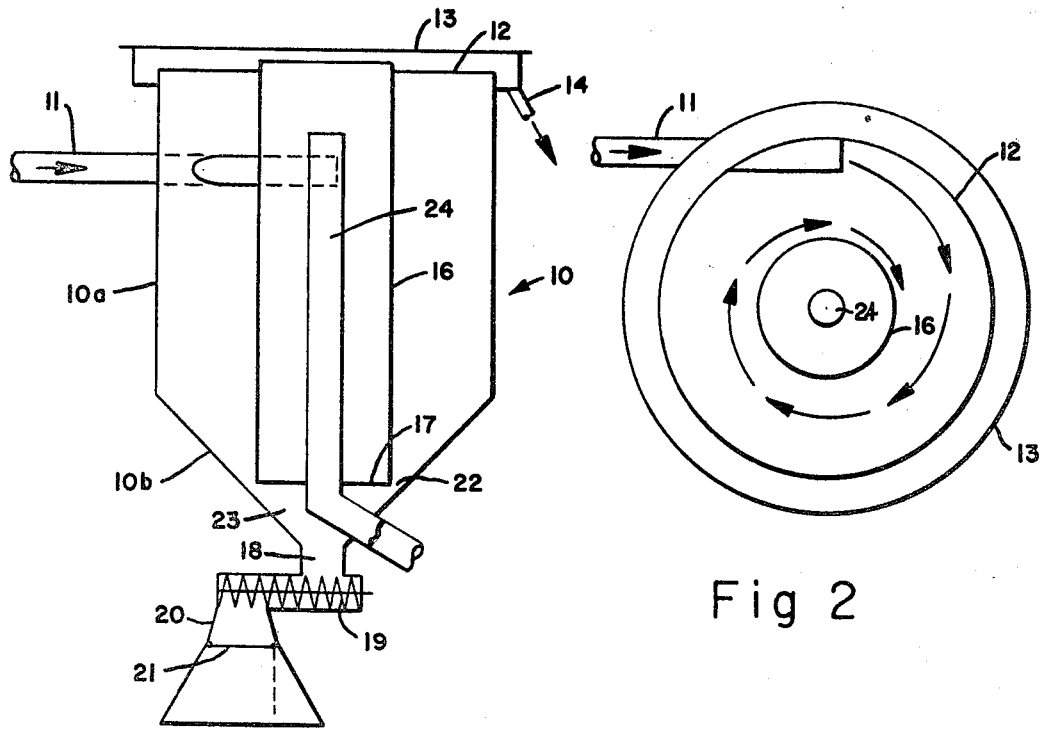
Fig 1
Fig 2
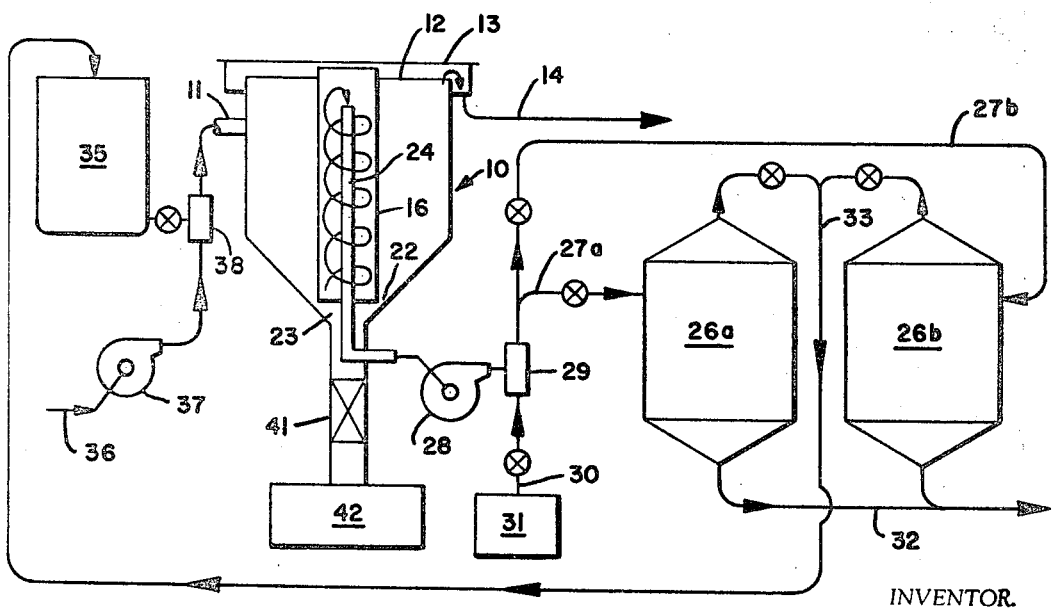
Fig 3
INVENTOR.
HARVEY E. FINCH
BY
ATTORNEYS

United States Patent Office 3,444,077
Patented May 13, 1969

3,444,077
LIQUID CLARIFYING METHOD
Harvey E. Finch, San Bruno, Calif., assignor of one-half to Richard Redlick, Portola Valley, Calif.
Filed Jan. 21, 1965, Ser. No. 426,941
Int. Cl. B01d 11/02
U.S. Cl. 210—28                                 2 Claims

ABSTRACT OF THE DISCLOSURE

A method for clarifying a slurry containing water and granular material and for removing oil from oil contaminated water. The slurry (including the oil contamination) is delivered tangentially into the upper portion of a body that is annular in section. Granular material is deposited in a collecting zone below the body. Separated liquid progresses upwardly through an inner isolated column and is removed from the upper part of the column. The water and granular material enter the collecting zone through a restricted annular space at the lower end of the column. Some separation takes place in both the outer body and inner column. Also in one embodiment the effluent from the above hydraulic separating operation is passed through a filter having a filter aid, and the filter aid when spent is mixed with raw oil contaminated water to force the feed to the hydraulic separating operation.

---

This application relates generally to methods for the clarification of slurries and liquids, and is applicable where granular filter aid materials are employed.

Many industrial processing operations employ granular filter aid materials in continuous or batch filtering operations to assist in the removal of materials from an effluent. For example, in instances where sand filters are employed, it is common practice to apply a layer of a granular filter aid to the top of the sand bed before commencing a filter cycle. The filter aid may be any one of several materials used for this purpose, including granular diatomaceous earth, granular char and the like. In many instances the filter aid may have more or less adsorptive activity. After the filter aid has become spent, it is removed mechanically or by backwashing, and a fresh layer of filter aid material applied. In some instances the spent filter aid material is discarded, and in other instances it is treated to permit its re-use. In a number of industrial processing operations, as for example in the petroleum industry, the filter aid picks up a substantial amount of oil. Assuming the use of backwashing to remove such an oil containing filter aid, it has been found relatively difficult to remove the water content of such a slurry in clarified form for re-use.

In general, it is an object of the present invention to provide a method for effecting clarification of slurries containing spent or partially spent filter aid materials.

Another object is to provide a method applicable generally to the clarification of aqueous liquids, including oil contaminated water, various waste liquors, and the like.

Another object of the invention is to provide a method which enables clarification of the water content of a slurry containing filter aid material where the material has an oil content.

Another object is to provide a novel method which utilizes a filter cycle in conjunction with an operation for the treatment and utilization of the backwash slurry. In this connection, the present invention makes possible treatment of the backwash slurry for removal of a clarified liquid fraction, and in addition makes use of the clarifying operation to reduce the load upon the filter cycle.

Additional objects and features of the invention will appear from the following description in which the preferred embodiment of the invention has been set forth in detail in conjunction with the accompanying drawing.

Referring to the drawing:

FIGURE 1 is a side elevational view schematically illustrating apparatus for carrying out my method;

FIGURE 2 is a plan view of the apparatus shown in FIGURE 1; and

FIGURE 3 is a schematic view illustrating a system which incorporates the apparatus of FIGURE 1.

My method can be best understood after a description of the apparatus shown in FIGURE 1. This consists of a tank 10 having an upper substantially cylindrical shaped portion 10a and a lower substantially conical shaped portion 10b. A pipe 11 extends tangentially into the upper portion of the tank and serves to introduce the feed material. The upper edge or lip 12 of the tank is in a horizontal plane and forms a spill-over weir. A collecting launder 13 serves to receive any material passing over the weir 12 for removal through the pipe 14.

Extending vertically within the tank and aligned with the vertical axis of the same there is a partitioning member 16 which preferably is substantially cylindrical. The lower edge 17 of this member terminates in close proximity with the sloping walls of the conical shaped portion 10b. The upper end terminates above the level of the weir 12.

The lower end of the tank is provided with the outlet opening 18, below which is a discharge device 19 of the feed screw type, which serves continuously to deliver collected granular material. The feed screw is shown delivering the granular material to the chamber 20 which normally is closed by the spring-urged gate 21. The gate 21 is opened when sufficient pressure is applied to its upper side by the granular material. It will be evident that in some instances this gate may not be spring loaded, but may be connected with suitable manual means whereby it may be opened and closed as desired.

My method, when carried out with the apparatus of FIGURE 1, may be as follows: a slurry containing a liquid medium like water together with a granular filter aid material is pumped through the pipe 11 to maintain a body of material within the tank 10. Because of the tangential positioning of the pipe 11, the body of the material within the tank is caused to swirl about its vertical axis. Within the tank the solid granules are subjected to separating forces, both centrifugal and gravity, whereby they progress downwardly into the conical portion 10b. This material passes through the relatively restricted annular space 22 immediately underlying the lower edge 17 of the member 16 to collect within the zone 23 which immediately underlies the lower open end of member 16. The liquid content of this slurry progresses upwardly through the member 16 with some swirling movement caused by residual swirling movement of liquid entering the lower end of member 16. At the upper end of the liquid column maintained in member 16, the clarified liquid flows into the upper open end of the pipe 24 for removal. Solid granular material continuously collecting in the zone 23 is removed by the device 19, and this material thereafter can be discarded or treated for re-use. The amount of material pumped into the tank by the feed pipe 11 is such the tank 10 is maintained filled with liquid material, with a small amount spilling over the weir 12. This spill-over may carry with it a small amount of floating material. The level of the column within the member 16 will be substantially the same as the level within the tank 10. The liquid moving upwardly through the member 16 is largely clarified, but some further clarification takes place before the liquid enters the upper end of the pipe 24 by virtue of centrifugal swirling movement.

The method as described above is applicable generally to slurries containing granular filter aids. However, my method is particularly applicable to slurries of this type which also contain a material such as an oil or coagulant aid. For example, the invention is applicable to filter aids having an oil content, and which may result from filtering cycles employed in the petroleum industry. When such a slurry containing a filter aid like granular diatomaceous earth having an adsorbed oil content is mixed with an agglomerating agent and introduced into the apparatus of FIGURE 1, the oil containing granules while settling are brought into random contacts to form larger agglomerates. These larger agglomerates more effectively and readily separate from the liquid, to collect within the zone 23 for removal.

The agglomerating agent may vary depending upon the substance carried by the filter aid from the filtering cycle. Assuming that it is desired to remove a filter aid having an adsorbed mineral oil content from a water slurry, then this slurry can be mixed with a raw feed water having an oil content that is largely emulsified, whereby when the slurry enters the tank 10 it consists of granular filter aid material having an adsorbed oil content together with a liquid medium containing emulsified oil which serves as an agglomerating or coagulating agent. Within the tank 10 the unadsorbed oil attaches itself to the granules of filter aid material to produce string-like aggregates that are delivered through the annular opening 22 into the lower end of the conical shaped portion 10b. Thus, in this instance two desirable results are accomplished. The filter aid is agglomerated and removed, and a substantial part of the oil of the feed water is removed with the agglomerated filter aid.

The system of FIGURE 3 incorporates the apparatus described above. The units 26a and 26b represent filter units of the sand bed type. Lines 27a and 27b are shown for delivering a liquid feed material to the filter units and they connect to the discharge side of the pump 28 through the eductor 29. This eductor is also shown connected by line 30 to the filter aid source 31. With this arrangement a fresh slurry prepared at 31 can be introduced through the eductor 29 to be intermixed with the discharge from the pump 28 and delivered to the two filter units to provide a desired pre-coat layer. After a sufficient filter aid layer has been applied over the sand bed, further supply of the filter aid is discontinued and thereafter the liquid from pump 29 is passed through the filter and sand beds. Line 32 represents the withdrawal of a clarified liquid from the filter units. Line 33 represents the withdrawal of backwash slurry containing filter aid from the filter units 26a and 26b, with this backwash slurry being delivered to the storage tank 35. Line 36 represents a source of raw liquid to be treated, as for example raw water containing emulsified oil, which has been separated from crude oil. Pump 37 serves to deliver this raw feed liquid through the eductor 38 into the feed pipe 11 of the clarifying apparatus. The eductor 38 is also shown connected to the tank 35 whereby the raw liquid is intermixed with spent backwash slurry before being applied to the tank 10 of the clarifier. The clarified liquid flowing through the pipe 24 is delivered to the intake side of the pump 28. The agglomerated filter aid material in the collecting zone 23 is discharged through the control gate or discharge device 41 (which may be the screw discharge device 19 of FIGURE 1) for delivery to the storage tank 42. From this tank the oil laden filter aid material may be delivered to additional processing steps for recovery of oil.

The system shown in FIGURE 3 operates as follows: raw liquid, such as water with an oil content separated from the output of a producing oil well, is supplied to the pump 37 and from thence delivered to the eductor 38. Here the raw water is intermixed with the slurry containing spent filter aid material and water. The resulting slurry mix is delivered tangentially into the tank 10 where agglomeration and separation takes place as previously described. The agglomerating action serves to take up a substantial part of the oil from the raw feed liquid, and results in the formation of aggregates which effectively separate out in the zone 23. The clarified liquid passing out through the pipe 24 is delivered by pump 28 through the eductor 29 to one or the other or both of the filter units 26a and 26b. It will be understood that at the commencement of a cycle of operation of one of these units, the sand bed is overlaid with a bed of filter aid material which is delivered into the filter tank from the filter aid source 31. Since the raw liquid feed has a substantial amount of its oil content removed during clarification of the filter aid slurry, the load upon the filter units 26a and 26b is correspondingly reduced, thus permitting these units to operate more effectively with more efficient oil removal and with a more efficient filter cycle.

Although in the foregoing description I have referred particularly to filtering operations wherein the granular filter aid becomes contaminated with an oil removed from the raw feed liquid, it will be understood that ingredients other than mineral oil may be involved, and when adsorbed by the filter aid may provide a slurry which can be treated to effect agglomeration and clarification of the slurry liquid content in the manner described above. Also, agglomerating or coagulating agents other than oil may be employed. For example, where water is being treated by a process involving introduction of a flocculating agent like alum followed by filtration to provide clarified potable water, the filter employed may be one which uses a granular filter aid. The system shown in FIGURE 3 may be applied whereby backwash filter aid slurry is delivered to tank 35 and from thence discharged into tank 10, together with water from line 36. The latter may be a part of the water that would otherwise be fed to the filter and which contains a flocculating or coagulating agent like alum, together with flocs that have been formed by virtue of the presence of alum. Clarified water from pipe 24 can be fed to the filter for further clarification.

Another example is a waste liquid treatment system such as may be employed for treatment of liquids like the effluent from an activated sludge sewage disposal process. Here again the effluent can be treated with a flocculating or coagulating agent like alum, preparatory to feeding the same to a sand filter having a granular filter aid. Backwash filter aid slurry is fed from tank 35 to tank 10, together with a feed effluent introduced by line 36. This effluent contains a coagulant (e.g. alum) to aid coagulation in tank 10 and to effect clarification to produce a clarified water that is discharged through pipe 24. Such clarified water can be fed to the sand filter for further clarification.

In addition to the flocculating agents or coagulants referred to above, reference can be made to other agents that have been used for this purpose, such as ferric chloride, ferric sulfate, or various poly electrolytes (e.g. Nalco 600 and 601 made by Nalco Chemical Co., Dow Seperan made by Dow Chemical Co., and Bentonite.)

An example of the invention is as follows: the equipment employed was substantially as shown schematically in FIGURE 3. The filter was of the sand bed type. The filter aid employed was rice hull which had been subjected to burning to produce a resulting granular material having a carbon content of about 33 percent, the remaining skeletal material being siliceous. Such a material is disclosed in my copending application Ser. No. 414,184, filed Nov. 27, 1964. The particle size of this material was such that most of the material passed through a 30 mesh screen and remained upon a 150 mesh screen.

The raw water was that resulting from the treatment of the output of an oil well for the separation of crude oil from the oil contaminated water. This raw water contained about 68 p.p.m. oil, mainly in emulsified form. The backwash slurry from the filtering operation (corresponding to filter unit 26a) comprised about 5 percent spent filter aid and 95 percent water, and the filter aid contained about 30 percent adsorbed oil. This backwash slurry was intermixed with raw feed water in the proportions of 10 parts raw feed water to each part of backwash slurry (by volume). The resulting slurry was then supplied to equipment corresponding to that shown in FIGURES 1 and 2, with the rate of discharge through the pipe 11 being such as to maintain a small amount of spill over the weir 12. Within the tank 10 the body of material undergoing treatment swirled about the central vertical axis and agglomeration took place in the region surrounding the cylindrical member 16, with string-like agglomerates of substantial size passing downwardly through opening 22 into the collecting zone 23. Such aggregates were continuously removed from the zone 23 and comprised 40 percent filter aid, 40 percent oil content, and 20 percent water, with substantially all of the oil content being held by the filter aid aggregates. Clarified water was continuously withdrawn through the pipe 24, and contained about 30 p.p.m. residual oil. It was used as a feed to the filter operation. The clean water withdrawn from the filtering operation contained 1 p.p.m. or less of residual oil.

I claim:

1. In a method for the clarification of mineral oil contaminated water, subjecting an oil contaminated water to filtration by passing the same through a filter medium having a layer of granular filter aid material on the same, whereby some mineral oil is absorbed by the granular filter aid material, removing spent filter aid material from the filtering operation and replacing the same with fresh filter aid, said spent filter aid being removed in a water-filter aid slurry, mixing said slurry with oil contaminated raw water being fed to the method, subjecting said slurry mixture to hydraulic separation and agglomeration with oil from the raw water serving as an agglomerating agent, separately removing filter aid agglomerates and clarified water from the separating and agglomerating operation, and then supplying said clarified water to the filtering operation as said first named contaminated water.

2. A method as in claim 1 in which the hydraulic separation and agglomeration is carried out by supplying said slurry mixture to a confined body of the same so that the material of the body swirls about its vertical axis with filter aid material forming agglomerates and with such agglomerates settling out into a lower collecting zone for removal.

References Cited

UNITED STATES PATENTS

| | | | |
|---|---|---|---|
| 2,017,111 | 10/1935 | Walsh | 210—512 |
| 2,021,672 | 11/1935 | Spaulding | 210—46 |
| 2,108,168 | 2/1938 | Jenks | 210—49 |
| 2,126,151 | 8/1938 | Stutson | 210—55 |
| 2,135,442 | 11/1938 | Steindorf et al. | 210—525 |
| 2,314,621 | 3/1943 | Kelley | 210—49 X |
| 2,425,371 | 8/1947 | Green | 210—46 |
| 2,798,041 | 7/1957 | Thompson et al. | 210—512 X |
| 2,806,599 | 9/1957 | Patrick | 210—512 X |
| 2,965,522 | 12/1960 | Crespin et al. | 210—512 X |
| 3,215,623 | 11/1965 | Hix | 210—24 |
| 3,298,521 | 1/1967 | McKinlay | 210—75 |

FOREIGN PATENTS

| | | |
|---|---|---|
| 431,552 | 11/1911 | France. |
| 1,230,421 | 4/1960 | France. |
| 790,474 | 2/1958 | Great Britain. |

REUBEN FRIEDMAN, *Primary Examiner.*

C. M. DITLOW, *Assistant Examiner.*

U.S. Cl. X.R.

210—40, 55, 73, 75, 76, 265, 304, 512